United States Patent [19]

Phillips

[11] 4,001,486
[45] Jan. 4, 1977

[54] LATEX COAGULANT FOR EMULSION BREAKERS

[75] Inventor: Kenneth G. Phillips, River Forest, Ill.

[73] Assignee: Nalco Chemical Company, Oak Brook, Ill.

[22] Filed: June 11, 1975

[21] Appl. No.: 586,111

[52] U.S. Cl. .............................. 528/492; 260/2 BP; 528/490
[51] Int. Cl.$^2$ .......................................... C08F 6/22
[58] Field of Search ................ 260/94.7 A, 88.2 S, 260/85.1, 83.3, 29.6 PT, 96 R, 2 BP; 528/492

[56] References Cited

UNITED STATES PATENTS

| | | | |
|---|---|---|---|
| 3,732,173 | 5/1973 | Nagy | 260/2 BP |
| 3,738,945 | 6/1973 | Panzer | 260/2 BP |
| 3,875,104 | 4/1975 | Siegele et al. | 260/33.6 AQ |

*Primary Examiner*—Stanford M. Levin
*Attorney, Agent, or Firm*—John G. Premo; Robert A. Miller; Barry W. Sufrin

[57] ABSTRACT

A method for coagulating synthetic rubber latices using an epichlorohydrin-dimethylamine copolymer.

6 Claims, 1 Drawing Figure

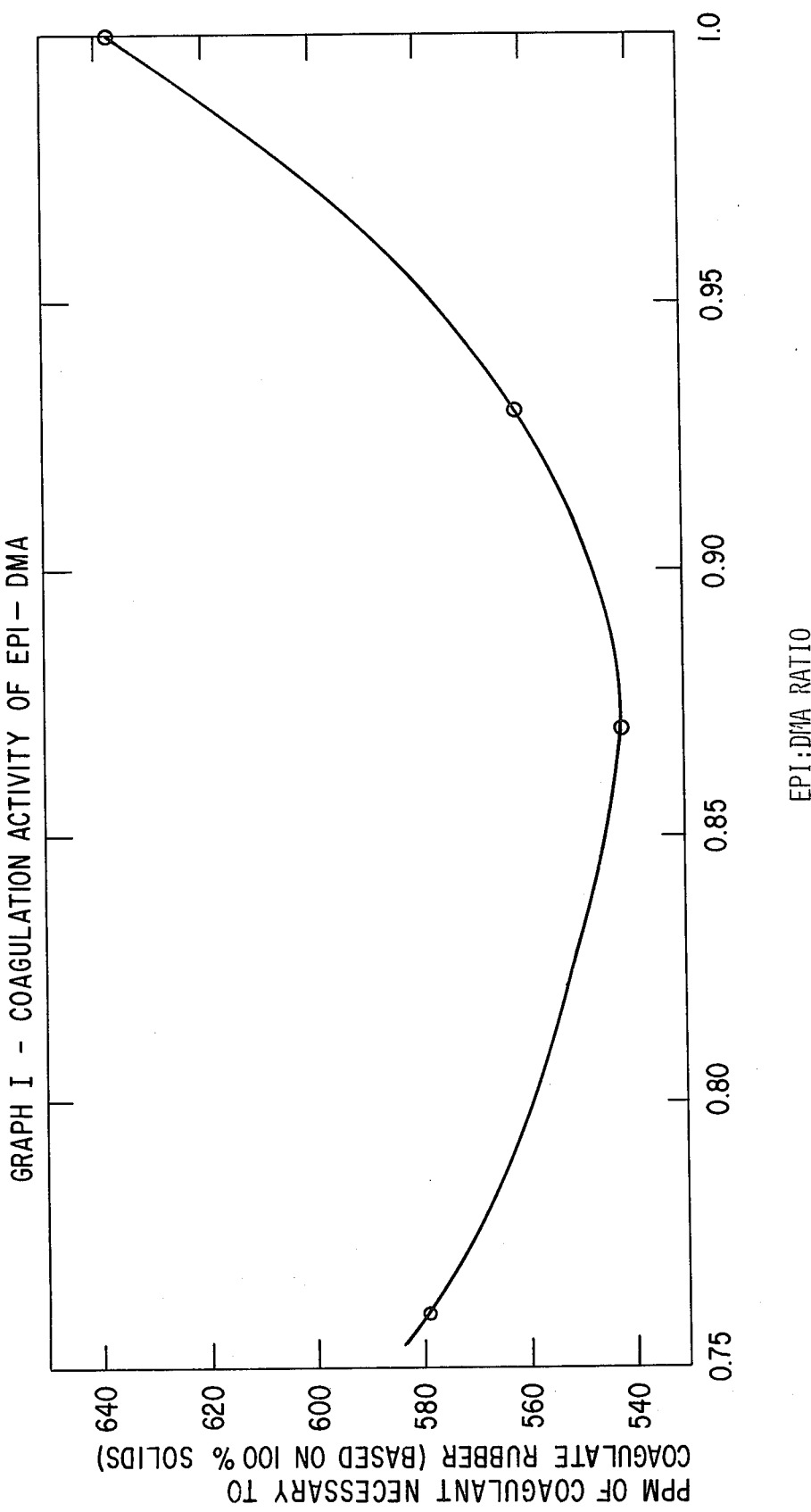

LATEX COAGULANT FOR EMULSION BREAKERS

INTRODUCTION

The manufacture of synthetic rubber by emulsion polymerization entails the formation of a synthetic rubber latex. Transformation of this latex into a non-coherent rubber crumb requires the coagulation of the synthetic rubber particles present in the latex. Various coagulants are employed by the rubber industry to effect the coagulation of the rubber particles. Among the most commonly used coagulants are sodium chloride and polyethyleneimine.

My invention discloses a method of coagulating synthetic rubber latices using a compound not hitherto known to be effective for this use. The compound used in my invention, epichlorohydrindimethylamine copolymer, is effective in coagulating many different synthetic rubber latices, including: styrene-butadiene, polyisoprene, polybutadiene, ethylene-propylene, acrylonitrile-butadiene. Furthermore, synthetic rubbers coagulated by the method of my invention have properties as good as are produced through methods employing the other commonly utilized coagulants.

Epichlorohydrin-dimethylamine copolymer, in addition, has important advantages over polyethyleneimine. For example, the synthesis of epichlorohydrin-dimethylamine copolymer (hereafter referred to as EPI-DMA) is less complicated and time consuming than the synthesis of polyethyleneimine, and does not produce the troublesome by-products which result in the synthesis of polyethyleneimine. Rubber produced through the use of my method is clear water white as compared to the slightly yellow or amber product obtained through the use of polyethyleneimine.

OBJECTS OF THE INVENTION

It is an object of this invention to provide a method for coagulating rubber particles from synthetic rubber latex by treating the latex with an EPI-DMA copolymer. Other objects and uses of the invention will appear hereinafter.

THE INVENTION

The invention entails a method for coagulating synthetic rubber particles from a synthetic rubber latex using a water-soluble epichlorohydrin-dimethylamine copolymer, referred to herein as EPI-DMA.

The method requires that the pH of the synthetic rubber latex lie within the range of 1.5 to 7.0. Usually, the latex to be treated will be alkaline, and therefore will require the addition of acid prior to coagulation.

The latex, which has been pH adjusted if necessary, is treated with EPI-DMA in an amount sufficient to coagulate the latex. The amount of EPI-DMA necessary to do this will depend upon the pH of the latex prior to treatment. It will also depend upon the mole proportion of epichlorohydrin to dimethylamine present in the copolymer.

The EPI-DMA must be thoroughly dispersed within the synthetic rubber latex. When a high viscosity EPI-DMA is used, it may be necessary to prepare an aqueous solution of the coagulant in order to make it pumpable. We have found that the EPI-DMA can be effectively dispersed within small quantities of the latex by placing an EPI-DMA + latex mixture in an osterizer which is run for one minute at high sheer. After dispersal of the EPI-DMA, the coagulated rubber particles form and may be recovered as a non-coherent rubber crumb.

Although EPI-DMA containing varying relative proportions of epichlorohydrin and dimethylamine may be used in the method of my invention, I have found the most effective mole ratio of epichlorohydrin to dimethylamine to be in the range of 0.75 to 0.98 and most preferably 0.87. A wide range of molecular weights, ranging from as low as 200 to as high as 50,000 are similarly effective, and low molecular weights in the range of 200 to 2000 are especially effective. Useful dosages of active EPI-DMA will lie in the range of 25 to 2000 ppm, and preferably in the range of 300 to 800 ppm. In the most preferred embodiment of my invention, an EPI-DMA copolymer, composed of a ratio of epichlorohydrin to dimethylamine of 0.87, with a molecular weight in the range of 200 to 2000, is used in a dosage range between 450 and 600 ppm based upon active EPI-DMA.

The EPI-DMA useful in my invention may be prepared by conventional means. A useful method for preparing EPI-DMA is disclosed in U.S. patent application Ser. No. 522,381 filed Nov. 11, 1974, for Linear Dimethylamine Epichlorohydrin Polymers which is hereby incorporated by reference.

EXAMPLES

1. The purpose of this example was to determine the epichlorohydrin to dimethylamine ratio which gives a copolymer with optimal coagulating activity. A series of EPI-DMA samples containing mole ratios of epichlorohydrin to dimethylamine of 0.76, 0.87, 0.93 and 1.0 was prepared.

Styrene-butadiene (SBR) latex adjusted to pH 7.0 was treated with the EPI-DMA samples. Treatment involved the addition of the EPI-DMA to the latex followed by thorough dispersal in a Waring blender. Increasing amounts of EPI-DMA were added until coagulation was effected. The results of these tests appear in Graph I. It should be noted that an EPI-DMA mole ratio of 0.87 was found to be optimal.

2. As mentioned earlier, two important coagulants presently employed in the rubber industry are sodium chloride and polyethyleneimine. These compounds are used not only because they are effective coagulants, but also because they do not impart unfavorable characteristics to synthetic rubber. Therefore, it is useful to compare rubber coagulated with EPI-DMA to rubber coagulated with sodium chloride and rubber coagulated with polyethyleneimine, as is done below.

In this series of experiments, ASTM tests of modulus, tensile strength, elongation, hardness, scorch time and cure were performed on SBR rubber coagulated with EPI-DMA, with sodium chloride and with polyethyleneimine. Both freshly coagulated rubber and accelerated heat aged rubber samples were tested, with results as set forth in Table I. Analyses of these results show that dosagewise EPI-DMA performs far better than sodium chloride and about as well as polyethyleneimine. The EPI-DMA produced a lighter color rubber than is produced by use of polyethyleneimine.

EPI-DMA copolymer with a mole ratio of epichlorohydrin to dimethylamine of 0.85 and a solids content of 70% active polymer was produced for use in this Example. Synpol 1500 latex, which is a widely available SBR latex with high stability towards coagulants was used. The particular Synpol 1500 used was a cold, non-pigmented copolymer and did not contain an antioxidant.

The samples of the Synpol 1500 latex were adjusted to pH 4.0, coagulated in a 1 gallon Waring blender, washed with water and treated in a forced air oven at 60° C.

After the crumb so produced was dried, it was compressed in a 2 roll mill. A portion of the compressed crumb was placed in plastic bags and aged at 72° F. The remainder of the crumb was immediately compounded.

The aged and unaged samples were subjected to the ASTM tests referred to above with results as shown in Table I. Some scattering of data was caused by the lack of antioxidant in the latex. Careful study of the data indicates that the measured properties of the rubber produced by the use of EPI-DMA as a coagulant are as good as the corresponding properties of rubber produced by the use of the sodium chloride or the polyethyleneimine coagulant.

CONCLUSION

Epichlorohydrin-dimethylamine copolymer is a new and useful coagulant for synthetic rubber latices. It produces a non-coherent rubber crumb with desirable qualities and represents a desirable alternative to the coagulants presently used in the rubber industry.

I claim:

1. A method for coagulating synthetic rubber particles from a synthetic rubber latex using a water-soluble epichlorohydrin-dimethylamine copolymer of molecular weight 200 to 2,000 comprising the steps of:

A. Adjusting the pH of the synthetic rubber latex within the range of 1.5 to 7.0;
B. Adding an amount of the epichlorohydrin-dimethylamine copolymer sufficient to coagulate the synthetic rubber latex with the mole ratio of epichlorohydrin to dimethylamine being within the range of from 0.75 to 0.98;
C. Thoroughly dispersing the epichlorohydrin-dimethylamine copolymer within the synthetic rubber latex for a period of time sufficient to form coagulated rubber particles; and,
D. Recovering the coagulated synthetic rubber particles.

2. The method of claim 1 wherein the synthetic rubber latex is chosen from the group consisting of: acrylonitrile-butadiene latex, ethylene propylene latex, polybutadiene latex, polyisoprene latex, and styrene-butadiene latex.

3. The method of claim 1 wherein the epichlorohydrin-dimethylamine polymer contains a mole ratio of epichlorohydrin to dimethylamine of 0.87.

4. The method of claim 1 wherein the amount of epichlorohydrin-dimethylamine polymer, based upon the latex, is 25 to 2000 ppm by weight.

5. The method of claim 1 wherein the amount of epichlorohydrin-dimethylamine polymer based upon the latex, is 300 to 800 ppm.

6. The method of claim 1 wherein the epichlorohydrin-dimethylamine polymer contains a mole ratio of epichlorohydrin to dimethylamine of 0.7 to 0.98.

TABLE I

COMPARISON OF COAGULATED RUBBER

| SAMPLE | COAGULANT | DOSAGE (PPM ACTIVE) | AGING (WEEKS) | COMPOUNDED OR UNCOMPOUNDED | MOONEY VISCOSITY | SCORCH TIME | T-90 CURE | CURE TIME | 100% MODULUS | 300% MODULUS | TENSILE | ELONGATION | SHORE HARDNESS |
|---|---|---|---|---|---|---|---|---|---|---|---|---|---|
| 1-1 | EPI-DMA | 760 | 0 | C | 80.0 | 8.5 | 32.0 | 25 | 328 | 1776 | 3134 | 450 | 66 |
| 1-2 | NaCl | 150,000 | 0 | C | 80.4 | 8.6 | 34.8 | 25 | 306 | 1647 | 2650 | 416 | 66 |
| 1-3 | EDC*-Ammonia | 980 | 0 | C | 85.7 | 8.7 | 34.2 | 25 | 330 | 1784 | 2923 | 441 | 65 |
| 2-1 | EPI-DMA | 760 | 4 | C | 80.6 | 8.2 | 32.2 | 25 | 390 | 2352 | 3569 | 407 | 68 |
| 2-2 | NaCl | 150,000 | 4 | C | 83.4 | 8.9 | 34.5 | 25 | 393 | 2375 | 3393 | 401 | 70 |
| 2-3 | EDC*-Ammonia | 980 | 4 | C | 86.6 | 8.5 | 32.2 | 25 | 384 | 2254 | 3011 | 377 | 71 |
| 3-1 | EPI-DMA | 760 | 4 | U | 82.0 | 7.8 | 31.7 | 25 | 436 | 2628 | 3630 | 365 | 68 |
| 3-2 | NaCl | 150,000 | 4 | U | 85.4 | 7.6 | 34.0 | 25 | 381 | 2065 | 3210 | 400 | 67 |
| 3-3 | EDC*-Ammonia | 980 | 4 | U | 86.0 | 7.3 | 32.3 | 25 | 371 | 2031 | 3138 | 410 | 67 |
| 4-1 | EPI-DMA | 760 | 12 | C | 86.0 | 8.3 | 31.5 | 25 | 494 | 3008 | 3717 | 354 | 71 |
| 4-2 | NaCl | 150,000 | 12 | C | 84.0 | 8.0 | 34.2 | 25 | 466 | 2694 | 3490 | 362 | 72 |
| 4-3 | EDC*-Ammonia | 980 | 12 | C | 87.2 | 8.4 | 33.3 | 25 | 466 | 2891 | 3523 | 347 | 71 |
| 5-1 | EPI-DMA | 760 | 12 | U | 80.4 | 6.4 | 31.0 | 25 | 404 | 2704 | 3732 | 368 | 69 |
| 5-2 | NaCl | 150,000 | 12 | U | 85.6 | 7.0 | 34.5 | 25 | 400 | 2341 | 3437 | 387 | 68 |
| 5-3 | EDC*-Ammonia | 980 | 12 | U | 87.8 | 7.5 | 33.7 | 25 | 427 | 2761 | 3731 | 371 | 69 |
| 6-1 | EPI-DMA | 760 | 24 | C | 84.6 | 8.3 | 31.8 | 25 | 497 | 3108 | 3578 | 312 | 72 |
| 6-2 | NaCl | 150,000 | 24 | C | 81.6 | 7.6 | 34.3 | 25 | 484 | 2886 | 3394 | 336 | 71 |
| 6-3 | EDC*-Ammonia | 980 | 24 | C | 88.0 | 8.3 | 32.8 | 25 | 500 | 3061 | 3368 | 313 | 72 |
| 7-1 | EPI-DMA | 760 | 24 | U | 86.0 | 6.75 | 31.3 | 25 | 405 | 2639 | 3351 | 356 | 68 |
| 7-2 | NaCl | 150,000 | 24 | U | 88.4 | 6.0 | 31.7 | 25 | 416 | 2579 | 3230 | 353 | 68 |
| 7-3 | EDC*-Ammonia | 980 | 24 | U | 90.0 | 7.5 | 33.5 | 25 | 409 | 2603 | 3734 | 383 | 68 |

*ethylene dichloride